United States Patent [19]
Ayers et al.

[11] Patent Number: 4,750,010
[45] Date of Patent: Jun. 7, 1988

[54] CIRCUIT FOR GENERATING CENTER PULSE WIDTH MODULATED WAVEFORMS AND NON-IMPACT PRINTER USING SAME

[75] Inventors: Charles E. Ayers; Kenneth D. Kieffer, both of Rochester; Yee S. Ng, Fairport; Hieu T. Pham, Webster; Pin S. Tschang, Rochester; Eric K. Zeise, Pittsford, all of N.Y.

[73] Assignee: Eastman Kodak Company, Rochester, N.Y.

[21] Appl. No.: 295

[22] Filed: Jan. 2, 1987

[51] Int. Cl.⁴ .......................... G01D 9/42; H04N 1/21
[52] U.S. Cl. .................................. 346/107 R; 358/298
[58] Field of Search ............ 346/76 L, 107 R, 107 A, 346/108, 160; 358/298, 302

[56] References Cited
U.S. PATENT DOCUMENTS

| | | | |
|---|---|---|---|
| 3,872,369 | 3/1975 | Rich | 340/347 DA |
| 3,988,742 | 10/1976 | Meier | 346/107 R |
| 4,445,796 | 5/1984 | Lisica et al. | 219/216 |
| 4,455,562 | 6/1984 | Dolan | 346/160 |
| 4,455,578 | 6/1984 | Fearnside | 358/302 |
| 4,525,729 | 6/1985 | Agulnek et al. | 346/107 |
| 4,626,923 | 12/1986 | Yoshida | 358/298 |

Primary Examiner—E. A. Goldberg
Assistant Examiner—Mark Reinhart
Attorney, Agent, or Firm—Norman Rushefsky

[57] ABSTRACT

A circuit for generating a set of center pulse-width modulated waveforms comprises a counter having a time changing count, and comparators which compare the count with respective preset counts. The preset counts to the comparators being set so that the set of waveforms created is center pulse-width modulated.

9 Claims, 6 Drawing Sheets

CIRCUIT FOR GENERATING CENTER PULSE WIDTH MODULATED WAVEFORMS AND NON-IMPACT PRINTER USING SAME

BACKGROUND OF THE INVENTION

1. Field of the Invention

This invention relates generally to circuitry for generating a series of center pulse-width modulated waveforms particularly for use in an imaging system for recording electronic signal information on a photosensitive or other radiation sensitive medium.

2. Description Relative to the Prior Art

Light emitting diode arrays are well known in the art for recording or printing an image on a photosensitive medium such as a film or paper or, alternatively, an electrophotographic receptor. In order to achieve high resolution, a large number of light emitting diodes are arranged in a linear array and means are included for providing a relative movement between the linear array and the photosensitive medium so as to effect a scanning movement of the linear array over the surface of the photosensitive medium. Thus, the photosensitive medium may be exposed to provide a desired image one line at a time as the LED array is advanced relative to the photosensitive medium either continuously or in a stepping motion. Each LED in the linear array is used to expose a corresponding pixel in the photosensitive medium in accordance with an image defining electronic signal information.

In the manufacture of such an array, it is conventional to form the array from subarrays of, say, 32, 64 or 128 LED's with many of these subarrays being combined to form the complete linear array. Where an image information signal requires that 1000 or more LED's be turned on for any one line, the demand for instantaneous current are large as is the generation of interfering electromagnetic radiation (EMI) with its attendant problems. Another problem with such LED arrays is that the respective light output from LED to LED varies even though the same current or more accurately pulse duration be applied to each. In one known approach, the subarrays are analyzed for light output. Those subarrays determined to be relatively weak emitters are provided with a strobe pulse duration "on-time" that is relatively longer than the nominal one used for subarrays providing an average light emission. On the other hand, those subarrays determined to be excessive light emitters are provided with a pulse duration "on-time" that is less than the nominal "on-time." In this approach, for each print line, the strobe pulses to the LED's have the starting times staggered to minimize EMI. The staggering was such that the set of waveforms defining the strobe pulses could be described as having center pulse-width modulation. The particular circuit used for generating the prior art waveform is not known to the inventors of this application. However, we have invented what we believe to be a novel and unobvious circuit for generating a set of center pulse-width modulated waveforms and a non-impact printer incorporating such a circuit.

SUMMARY OF THE INVENTION

The invention is directed to an improved circuit for generating a center pulse-width modulated set of waveforms. The circuit comprises digital counting means having a plurality of output lines representing in digital form a time changing numerical count; clock means for changing the count represented by the output lines; and comparator means for comparing the count with each of several predetermined counts and generating respective pulses each of which commences with a respective predetermined count and terminates with a respective predetermined count, the time duration of each pulse being different dependent upon the predetermined count selected so as to establish a common center time point for the set of waveforms. The invention is further directed to a non-impact printer incorporating such a circuit.

DESCRIPTION OF THE PREFERRED EMBODIMENT

Because apparatus of the type described herein are well known, the present description will be directed in particular to elements forming part of, or cooperating more directly with, the present invention.

Figure 1:
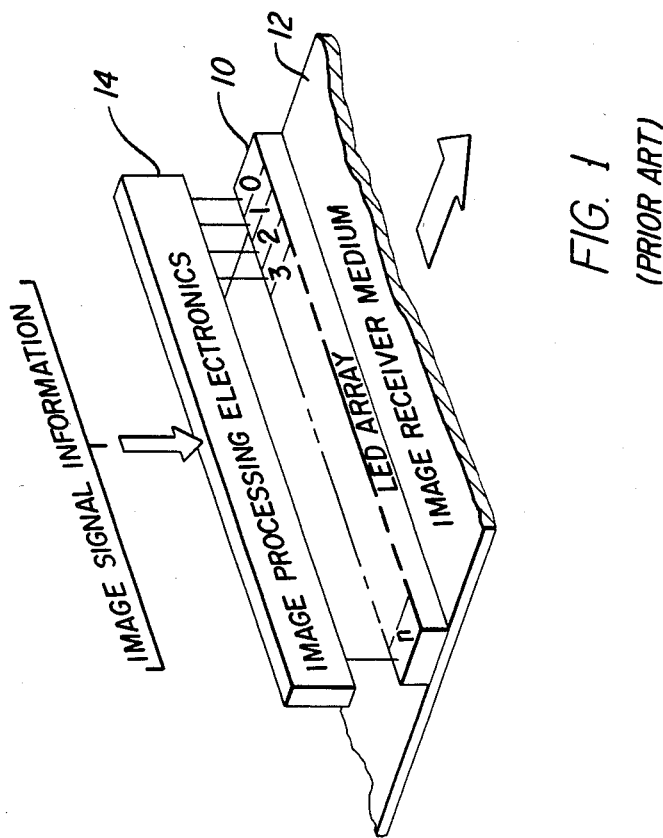
FIG. 1 is a perspective view illustrating the general arrangement of a prior art non-impact printer.

The apparatus for the herein disclosed invention is typified by the diagram of FIG. 1: a linear array 10 of 3583 triggerable radiation sources; e.g. LED's, is disposed to expose selectively a photosensitive image-receiver medium 12 that is movable relative to the array by suitable conventional means (not shown). Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LED's may be subsequently developed by conventional means to form a visible image. Where the medium 12 is an electrophotographic receptor, the LED's may be used to form an electrostatic image on a uniformly electrostatically charged photoconductor and this image developed using opaque toner particles and perhaps transferred to a copy sheet, see U.S. Pat. No. 3,850,517, the contents of which are incorporated herein.

Figure 2:
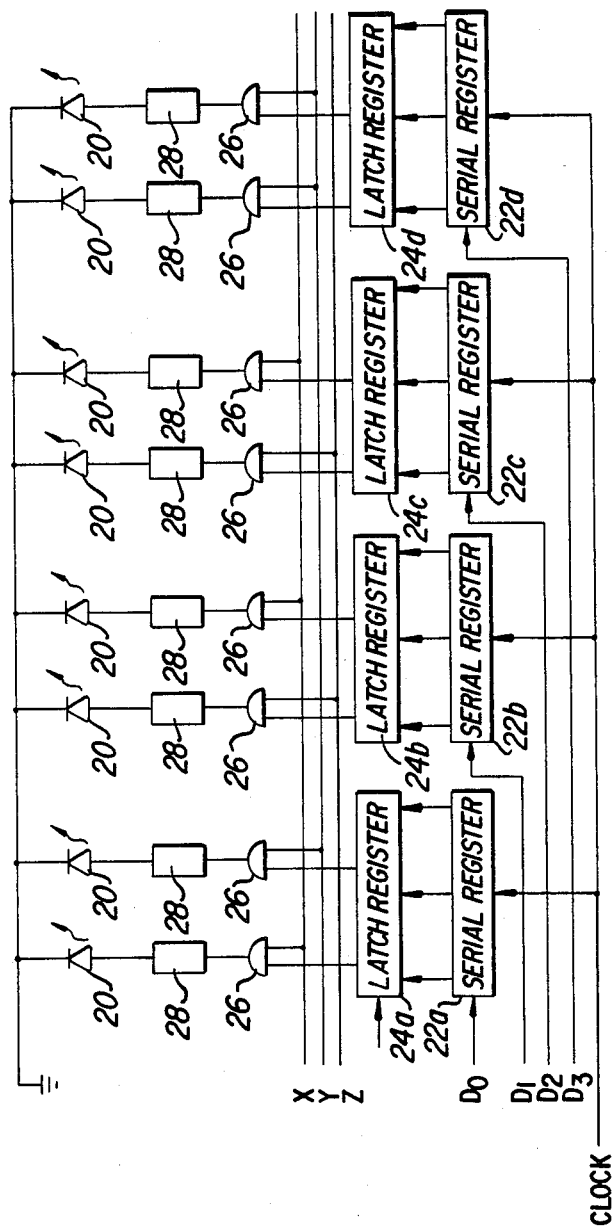
FIG. 2 is a schematic of a prior art circuit for driving a series of LED's used in the apparatus of FIG. 1.

With reference now to FIG. 2, a typical prior art circuit is shown which may be used for triggering selectively the LED's 20 that together comprise the array 10. Only a few of the LED's and its associated driver circuitry are shown for clarity purposes, it being understood that the circuitry for driving such other LED's is similar to that described for the illustrated examples. While the figure shows all the driver circuitry associated with the LED's located to one side of the line of LED's, it is well known to place these circuits on both sides of the line of LED's to provide more efficient utilization of space.

Data to be printed for each line is in the form of binary digital signals, e.g., 1's and 0's. This data on lines $D_0$–$D_3$ is serially shifted into four respective serial registers 22a–22d. With regard to the illustrated left most serial register 22a, it is used to store data for the left most 896 LED's, only two of which are illustrated. If a respective LED is to be triggered, a binary signal 1 will be stored in a respective location in register 22a. As is conventional, a clock signal is used to clock the data for each line of pixels into their respective positions in the serial registers. Just prior to triggering of the LED's, a transfer signal is provided by suitable conventional logic means, not shown, to transfer the data in parallel fashion to respective latch registers 24a, 24b, 24c and 24d. The trigger signals are then provided in suitable sequence over strobe lines X, Y and Z. Each of the LED's 20 is coupled to but one of these three strobe lines through a respective AND logic gate 26 and transistor driver 28. Each AND gate 26 has one input coupled to one of the lines X, Y and Z and its other input coupled to a respective latch register. An LED will thus be triggered or current will flow therethrough upon the simultaneous occurrence of a digital high level signal on the respective one of the strobe lines X, Y or Z and on the line coupled to the respective register in the latch register which stores the data signal.

As indicated above, it is desirable for the set of waveforms to be generated over lines X, Y and Z to be center pulse-width modulated. In the apparatus of this embodiment, it is preferred to have a series of 64 LED's comprise a subarray. In this subarray, the group of 32 odd numbered LED's from say 1 to 63 are coupled together to a selected one of the strobe lines X, Y and Z. The group of even numbered ones from say 0 to 62 also being coupled together to but one of the three strobe lines as well. The particular line to which any group of 32 LED's are coupled being predetermined as described above in the discussion relative to the prior art.

Figure 3:
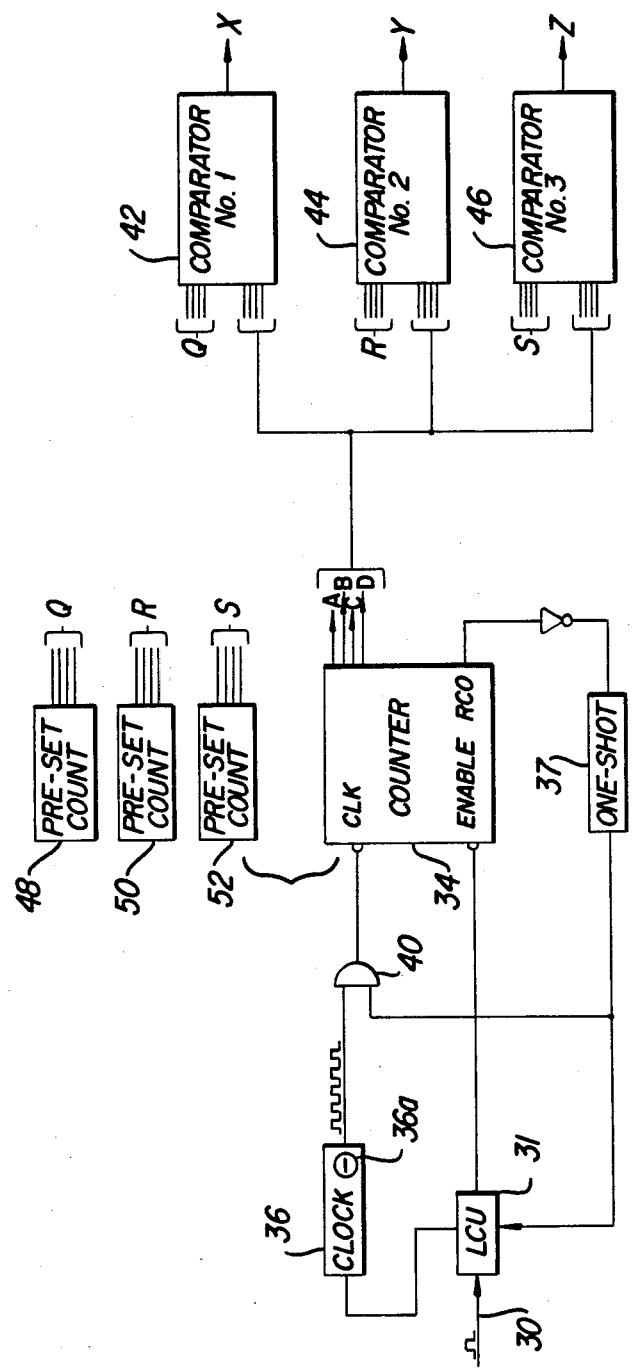
FIG. 3 is a schematic of a circuit for generating a set of center pulse-width modulated waveforms for use in the circuit of FIG. 2.
Figure 4:
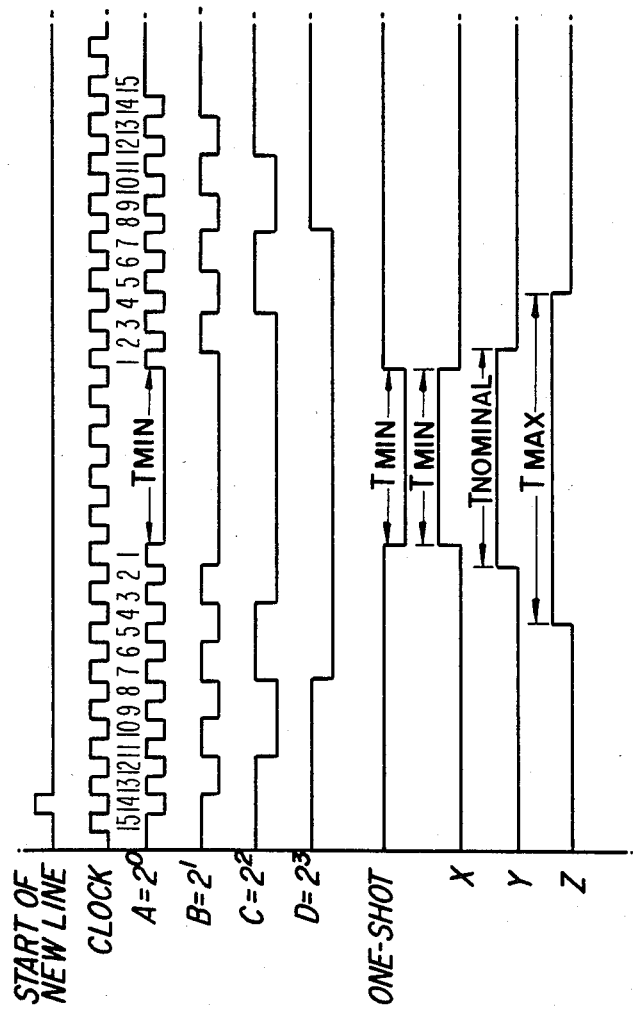
FIG. 4 is a diagram of sets of waveforms generated using the apparatus of the invention.
Figure 5:
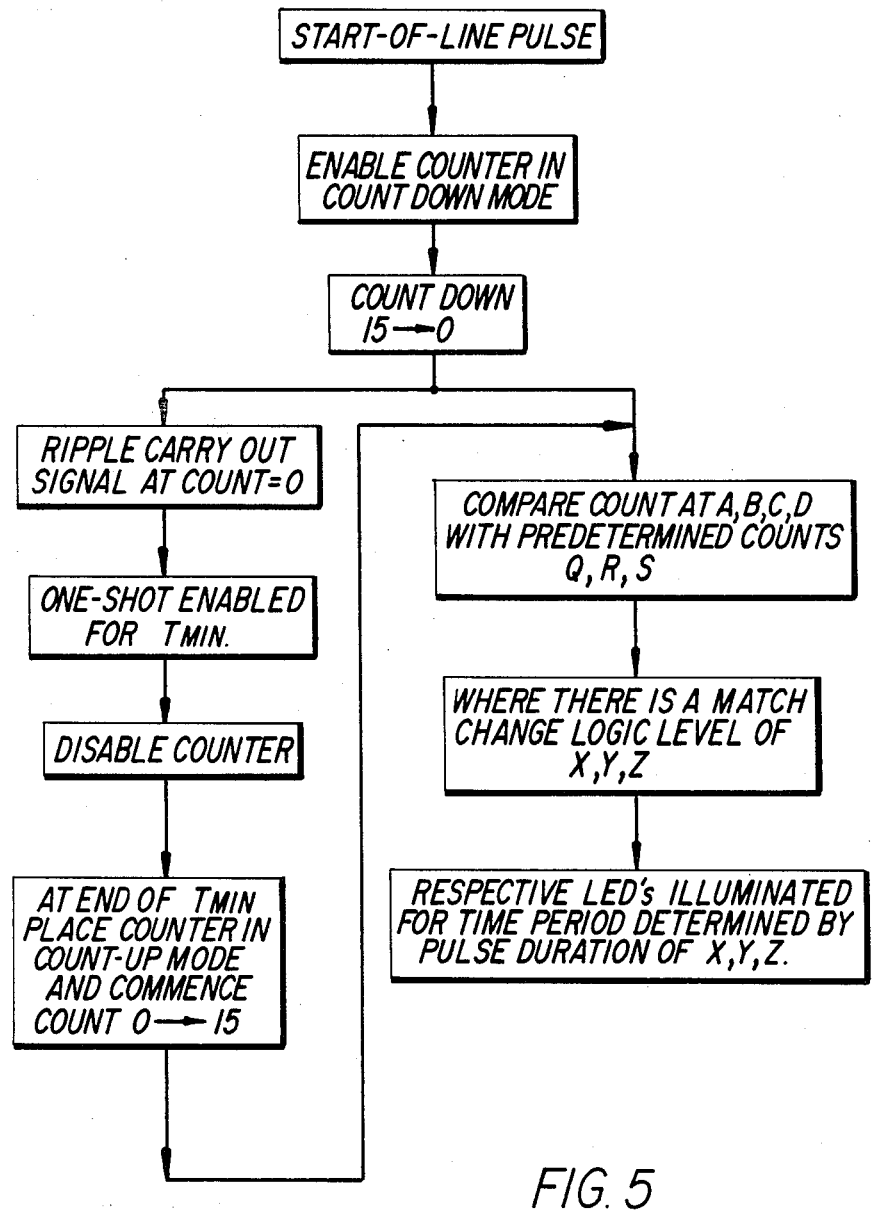
FIG. 5 is a flow chart of steps for producing a set of center pulse-width modulated waveforms.

With reference now to FIGS. 3 and 4, the circuit for generating a set of pulse-width modulated strobe signals will now be described. For each line of pixels to be printed, a start-of-line pulse will be provided by suitable conventional means (not shown) over line 30 to a logic and control unit (LCU) 31. The LCU may be a microcomputer or discrete logic devices. As is also conventional a memory device (not shown) is provided for storing therein in bit mapped form the data to be printed for, say, a whole page. It is this data that is fed line by line into appropriate serial registers 22a–22d over data lines $D_0$–$D_3$ in this regard, see for example U.S. Pat. No. 4,455,578. In response to the start-of-line pulse the output of the LCU provides a pulse to place up-down counter 34 in a countdown mode. Counter 34 counts clock pulses from a clock 36 which may be a crystal oscillator or a software generated clock signal generating device. The counter 34 commences to count these clock pulses starting from decimal fifteen (15) and counting down to zero (0). The instantaneous count is represented on the output lines A, B, C and D of the counter 34. As may be noted in FIG. 4, signals on the output lines A, B, C and D together represent in binary form a numerical sum. In FIG. 4, the decimal value of the numerical sum is indicated at each point in time as the counter counts down from 15 to 0 and then after a fixed delay counts back up to 15. As noted, line A represents the $2^0$ line, line B represents the $2^1$ line, line C represents the $2^2$ line and line D represents the $2^3$ line. Where the output of all these four lines is at a logic high level their sum is decimal 15. After the first clock pulse line A goes to a logic low level and the numerical sum of the four lines is now decimal 14. Similarly, with successive clock pulses, the decimal sum changes in accordance with the changes in lines A, B, C, and D as illustrated. The four lines A, B, C and D are coupled to each of three digital comparators 42, 44 and 46. Each of the digital comparators has in addition to the four input lines for receiving the signals on lines A, B, C and D an additional four lines for receiving or setting the comparator with a preprogrammed count. The comparators 42, 44 and 46 have respective output lines X, Y and Z which provide the stobe signals.

Pre-set count device 48 comprises a logic device which has been programmed to output a fixed predetermined digital logic signal on lines Q representing, in this example, the digital logic sum one (1). When the signal on each of the lines A, B, C and D are all logic zero (0) [and thus their sum is less than decimal one (1)] a positive going pulse will be generated as shown in FIG. 4 on line X. Since the counter 34 has counted down to zero, the duration of the positive going pulse on line X will be equal to that period in which the counter 34 remains at zero (0). This time period is now unrelated to pulses from clock 36 since a pulse from one-shot timer 37 in response to a ripple carry out signal from the counter 34 disables AND gate 40. The ripple carry out signal is generated in response to the counter reaching zero in the down counting mode. This gate is disabled by the one-shot timer for a predetermined time $T_{MIN}$. At the end of this predetermined time $T_{MIN}$, the gate 40 is once again enabled as the counter commences to count up the clock pulses from 0 to decimal 15. Preferably the clock signals are software generated and synchronized with signals from the LCU 31. The time $T_{MIN}$ may be established as the minimum time which a group of LED's are to be illuminated. Generally, it will be a group that provides a relatively higher light output as a group when each in the group receives a nominal pulse "on-time" of a predetermined amount of current. This group is thus compensated for by having all being coupled to strobe line X even though some in the group may be a relatively weaker or stronger light emitter.

Pre-set counters 50, 52 are each programmed in this example to output a fixed digital signal on lines R and S respectively indicating a count of decimal two (2) and five (5) respectively. The digital comparator devices 42, 44 and 46 operate such that each will provide a positive going output for so long as the numerical sum on lines A, B, C, and D is less than the respective pre-set count provided as an input to each of the comparators. Thus, with regard to comparator 44 a positive going pulse will be provided on line Y when the output of counter 34, represents a numerical sum less than decimal two (2). This may be noted in FIG. 4 wherein the positive going pulse on strobe line Y is for a duration $T_{NOMINAL}$ that commences during the down count phase of counter 34 when the signals on lines A, B, C and D represent a numerical sum less than two and terminates during the up count phase when the signals on lines A, B, C and D represent a numerical sum more than one. As may be guessed from its name, $T_{NOMINAL}$ represents an LED pulse "on-time" that provides a suitable pixel exposure for an average light emitting LED. In this embodiment, however, a group of 32 LED's in a subarray will be coupled to the strobe line Y if as a whole they provide what is considered to be an average light output for such a group of LED's.

Pre-set counter 52 outputs a fixed digital signal on lines S indicating a count of decimal five (5). A positive going pulse of duration $T_{MAX}$ is thus provided on line Z whenever the numerical sum of counter 34 is less than decimal 5 either during the down counting or the up counting phases of counter 34. Any groups of LED's tending as a whole to be relatively weaker light emitters will be attached to strobe line Z and will have a longer than nominal pulse "on-time" to compensate for their relatively weaker light output capabilities.

It may be noted from FIG. 4 that the strobe pulses on lines X, Y and Z start and end at different times yet they are centered relative to each other. As noted above, the different start times reduce the amount of EMI generated.

To provide for flexiblity in control of the exposure times it is preferred to have the pre-set count devices 48, 50 and 52 be programmable. They will allow one to adjust the on-time of LED's attached to one strobe line relative to others by control of the number of clock cycles during which the LED's will be enabled. $T_{MIN}$ may be made adjustable to adjust the on-times of all the LED's. The pulses generated from programmable clock 36 may have their pulse-widths made either of longer or shorter duration to control the difference between on-times of LED's attached to different strobe lines. It will be noted from FIG. 4 that the on-time difference between $T_{MIN}$ and $T_{NOMINAL}$ is in this example two clock pulse time units. By allowing for adjustment of clock pulse width or duration by, for example, adjusting a potentiometer 36a on the programmable clock this difference in time period may be advantageously adjusted as required for optimizing exposure control.

Figure 6:
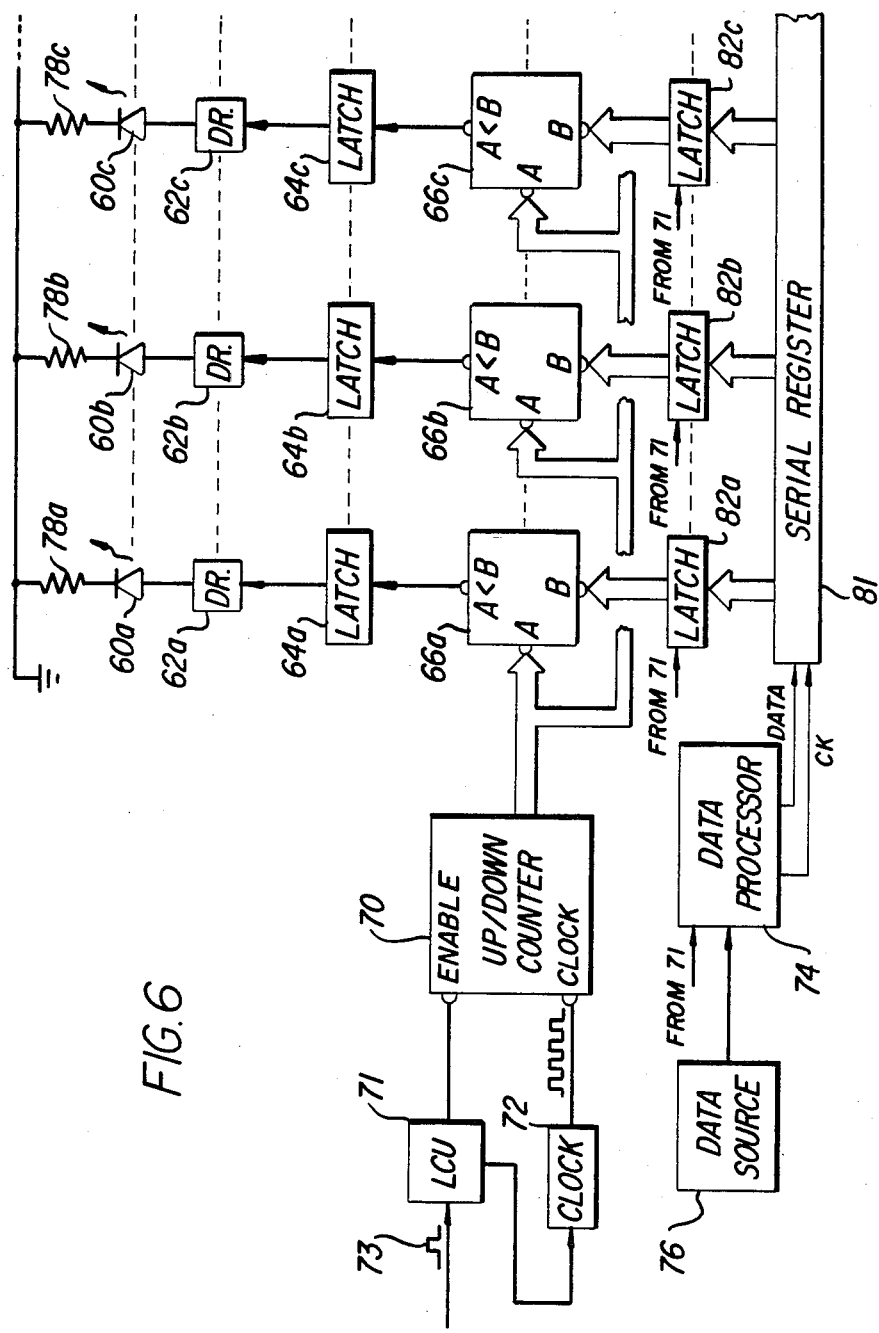
FIG. 6 is a diagram of a circuit of another embodiment of the invention.

In the above description a set of center pulse-width modulated waveforms is generated to provide more uniformity to LED's in the array 10. In the embodiment of FIG. 6 each LED is capable of being driven for a particular period or on-time determined by the data. This allows for grey-scale variation of an image element, dot or pixel during each cycle of operation. With reference now to FIG. 6, associated with each LED of a linear array (exemplified by LED's 60a, 60b and 60c) of say several thousands of LED's are a driver 62a, 62b and 62c respectively and a comparator 66a, 66b and 66c respectively. The comparators are coupled in turn to an up/down counter 70 and compare the output of the counter with a predetermined count, in this case, established by the data. The counter 70 is controlled by a computerized logic and control unit 71 or logic circuitry which enables the counter to commence counting clock pulses from a clock 72 upon receipt of a start of line pulse 73. Data to determine the on-time for each LED is provided at terminal B of each comparator and may comprise for example six binary bits representing an amount from decimal 0 to decimal 63. This data may be generated by a raster image processor or other conventional data processor 74 in accordance with data generated by a data source such as a computer 76. The data is shifted into a serial register 81. The six bits of data for each LED are then shifted into a six bit latch 82a, 82b, 82c associated with each of the LED's 60a, 60b, 60c, etc., respectively.

Suppose, for example, that LED 60a is to be enabled for a time period equal to twenty clock pulses plus $T_{MIN}$. $T_{MIN}$, as in the prior embodiment, represents a preestablished minimum LED on time. In response to the start of line pulse 73 the counter 70 is enabled and commences to count from decimal 63 to 0. The six bit output of counter 70 is coupled to terminal A of each of the comparators 66a, 66b, 66c, etc. This count is now compared with the data input at terminal B which represents the binary number eleven. When there is a "match," i.e., when the count of terminal A is ten or less, a pulse is provided at the terminal labelled A<B to cause latch 64a to enable the driver 62a to commence and maintain current to LED 60a. After the counter counts down to zero the counter is inhibited from counting additional clock pulses for a period $T_{MIN}$ that is either programmed into the counter or provided by a means similar to that described for the embodiment of FIGS. 1–5. After this predetermined time period $T_{MIN}$ the counter is set to count in its up mode and commences counting clock pulses again. When the clock, in its count up mode, reaches decimal 11 the latch is reset and current to the LED 60a ceases. The other LED's 60b, 60c, etc. operate in similar fashion but their data will require different count values to turn on and off. What these LED's will thus have in common with LED 60a is that all will have their respective current pulses centered. As in the prior embodiment the current level to each LED is the same but the pulse duration for each LED during each line of print is varied. In this embodiment the LED's may be initially "balanced" such as by adjusting a "trim" resistor 78a, 78b, 78c respectively associated with each LED. In lieu of balancing the LED's with trim resistors, correction for unequal light output may be provided by adjustment of the data in accordance with the characteristics of each LED. Thus a programmable read only memory device or PROM may store the characteristics of each LED and data for that LED can be modified to provide an input count at terminal B that represents data modified by the exposure characteristics of the LED. For example, for an LED that is a relatively strong light emitter the PROM would modify data bits for that LED to reduce the count that otherwise would be provided at terminal B based solely on the data.

Thus, there have been described new and improved circuitry and non-impact printers using such circuitry wherein strobe pulses for controlling the "on-time" of radiation emitting devices are controlled so that the respective set of pulses are center pulse-width modulated.

While the invention has been described with regard to an LED printer array, the invention is suited for other types of non-magnetic printers such as thermal, ink jet, etc.

The invention has been described in detail with particular reference to preferred embodiments thereof, but it will be understood that variations and modifications can be effected within the spirit and scope of the invention.

We claim:
1. A circuit for generating a center pulse-width modulated set of waveforms, the circuit comprising:
digital counting means having a plurality of output lines representing in digital form a time changing numerical count;
clock means coupled to the digital counting means for changing the count represented by the output lines; and
comparator means coupled to the output lines and comparing the time changing count with each of several different predetermined counts and generating respective pulses each of which commences with a respective predetermined count and terminates with a respective predetermined count the time duration of each pulse being different dependent upon the respective predetermined count selected and the respective predetermined counts also being selected so as to establish a common center time point for the set of waveforms.

2. The circuit of claim 1 and wherein the counting means is a counter having up and down counting modes and the respective predetermined count in which each pulse commences and terminates is the same numerical count but in different modes of the counter.

3. The circuit of claim 2 and wherein the clock generates clock signals and the pulse-width of the signals are of adjustable duration.

4. A non-impact printer which comprises:
an array of radiation emitting elements;
an imaging surface adapted to receive the radiation;
means for selectively enabling the elements for predetermined periods of time during a cycle of operation to form an image on the surface;
the enabling means including circuit means for generating a center pulse-width modulated set of waveforms for determining the enabling time of selected elements; and wherein the circuit comprises:
digital counting means having a plurality of output lines representing in digital form a time changing numerical count;
clock means coupled to the digital counting means for changing the count represented by the output lines; and
comparator means coupled to the output lines and comparing the time changing count with each of several different predetermined counts and generating respective pulses each of which commences with a respective predetermined count and terminates with a respective predetermined count the time duration of each pulse being different dependent upon the respective predetermined count selected and the respective predetermined counts also being selected so as to establish a common center time point for the set of waveforms.

5. The printer of claim 4 and wherein the array of radiation emitting elements comprises light emitting diodes and wherein some of the LED's of the array are enabled by one of the waveforms in the set and other light emitting diodes of the array are enabled by other waveforms in the set.

6. The printer of claim 5 and wherein the counting means is a counter having up and down counting modes and the respective predetermined count in which each pulse commences and terminates is the same numerical count but in different modes of the counter.

7. The printer of claim 6 and including data source means for providing different respective predetermined counts to establish for each of said elements different enabling times over the course of several cycles in accordance with data to be printed by said each of said elements.

8. The printer of claim 4 and including data source means for providing different respective predetermined counts to establish for each of said elements different enabling times over the course of several cycles in accordance with data to be printed by said each of said elements.

9. The circuit of claim 1 in combination with a light emitting member and coupled to the comparator means for enabling the light emitting member for an enabling time determined by one of said pulses.

* * * * *